US012759410B2

(12) United States Patent
Necknig et al.

(10) Patent No.: US 12,759,410 B2
(45) Date of Patent: Oct. 13, 2026

(54) METHOD FOR OPERATING A HYDRAULIC BRAKING SYSTEM, CONTROL UNIT AND BRAKING SYSTEM

(71) Applicant: ZF Active Safety GmbH, Koblenz (DE)

(72) Inventors: Markus Necknig, Waldesch (DE); Andreas Dahm, Koblenz (DE); Michael Olscher, Bonn (DE)

(73) Assignee: ZF Active Safety GmbH, Koblenz (DE)

( * ) Notice: Subject to any disclaimer, the term of this patent is extended or adjusted under 35 U.S.C. 154(b) by 1098 days.

(21) Appl. No.: 17/828,100

(22) Filed: May 31, 2022

(65) Prior Publication Data

US 2022/0379733 A1 Dec. 1, 2022

(30) Foreign Application Priority Data

May 31, 2021 (DE) ......................... 102021114025.0

(51) Int. Cl.

*B60T 13/74* (2006.01)
*B60L 7/26* (2006.01)
*B60T 13/58* (2006.01)
*B60T 13/68* (2006.01)

(52) U.S. Cl.

CPC .............. *B60L 7/26* (2013.01); *B60T 13/586* (2013.01); *B60T 13/686* (2013.01); *B60T 13/745* (2013.01); *B60T 2270/604* (2013.01)

(58) Field of Classification Search

CPC ........... B60T 2270/60; B60T 2270/604; B60T 13/745; B60T 13/586

See application file for complete search history.

(56) References Cited

U.S. PATENT DOCUMENTS

| | | | | |
|---|---|---|---|---|
| 7,980,638 B2 * | 7/2011 | Matsuzaki | ............ | B60T 13/662 303/114.1 |
| 12,065,117 B2 * | 8/2024 | Seol | ........................ | B60T 8/363 |
| 2010/0001577 A1 * | 1/2010 | Hatano | ................. | B60T 8/4081 303/3 |
| 2014/0319902 A1 * | 10/2014 | Benzler | ................. | B60T 13/662 303/6.01 |
| 2017/0072928 A1 * | 3/2017 | Kim | ........................ | B60T 7/042 |
| 2019/0381982 A1 * | 12/2019 | Bull | ...................... | B60T 13/588 |
| 2021/0078555 A1 * | 3/2021 | Kim | ...................... | B60T 13/142 |

(Continued)

FOREIGN PATENT DOCUMENTS

DE 102014205645 A1 10/2014

*Primary Examiner* — Bradley T King
(74) *Attorney, Agent, or Firm* — Kristin L. Murphy

(57) ABSTRACT

The disclosure relates to a method for operating a hydraulic braking system for a motor vehicle with an electrified drive train. The braking system comprises a brake booster. First, a braking request is registered and it is determined that the braking request is to be met by pure recuperative braking. In addition, an input member of the brake booster is shifted in the direction of a pressure generation unit so that it assumes an actuation position corresponding to the braking request. From here, the input member is then shifted back from the actuation position in a direction away from the pressure generation unit for hydraulic pressure relief. A control unit designed to carry out such a method is also disclosed. A braking system comprising such a control unit is also presented.

20 Claims, 2 Drawing Sheets

(56) References Cited

U.S. PATENT DOCUMENTS

| | | | | |
|---|---|---|---|---|
| 2021/0078558 | A1* | 3/2021 | Zipprich | B60T 13/745 |
| 2022/0134888 | A1* | 5/2022 | Ko | B60T 8/4081 303/3 |
| 2022/0234562 | A1* | 7/2022 | Ko | B60T 13/662 |
| 2022/0314944 | A1* | 10/2022 | Ko | B60T 13/146 |
| 2023/0048447 | A1* | 2/2023 | Ganzel | B60T 8/176 |
| 2023/0174036 | A1* | 6/2023 | Saotome | B60T 8/17616 701/78 |

* cited by examiner

METHOD FOR OPERATING A HYDRAULIC BRAKING SYSTEM, CONTROL UNIT AND BRAKING SYSTEM

CROSS-REFERENCE TO RELATED APPLICATION

This application claims priority to German Priority Application No. 102021114025.0, filed May 31, 2021, the disclosure of which is incorporated herein by reference in its entirety.

TECHNICAL FIELD

The disclosure relates to a method for operating a hydraulic braking system for a motor vehicle with an electrified drive train which has at least one electric drive machine that can be operated as a generator.

The disclosure also relates to a control unit for a hydraulic braking system which is designed to carry out such a method.

The disclosure further relates to a braking system comprising such a control unit.

BACKGROUND

A braking system comprises a brake booster which has a first input member which is coupled to a brake pedal, a second input member which is coupled to a drive unit of the brake booster, and an output member which is coupled to a hydraulic pressure generation unit.

Such methods, together with control units for carrying them out and braking systems equipped therewith, are known from the prior art. The second input member and the output member are often rigidly coupled to one another. It is also known to couple the second input member and the output member to one another via a resilient element such as a spring, so that the second input member and the output member of the brake booster move in unison except for a possible deformation of the resilient element.

A detection of a brake pedal movement to register a braking request from a driver usually takes place via a displacement sensor and/or via a force sensor on the brake pedal. The displacement sensor can usually be used to determine not only a brake pedal displacement, but also a brake pedal speed and a brake pedal acceleration.

Furthermore, known brake boosters are usually operated in such a way that a specific actuation position of the second input member is associated with each braking request which is characterized, for example, by the parameters mentioned above. In other words, brake boosters are controlled in such a way that the support provided for the braking process is dependent on the braking request. There is usually a fixed relationship between the actuation of the brake pedal, which is characterized in particular by a brake pedal displacement, a brake pedal speed and a brake pedal acceleration, and an associated actuation position of the second input member. Only in this way does the braking system behave predictably from the driver's point of view. The driver can thus use the braking system in a reliable and reproducible manner.

A method of the type mentioned at the outset is described in particular in DE 10 2014 205 645 A1. This document solves the problem of reducing the grinding or residual grinding torques occurring on wheel-side brake actuators in connection with pure recuperative braking, in order to be able to utilize a recuperation potential as fully as possible in this way. For this purpose, a hydraulic system is relieved of pressure, for which the second input member of the brake booster, together with the output member, is initially displaced a certain distance beyond the actuation position in the direction of the pressure generation unit. In this way, an additional volume of brake fluid or hydraulic fluid is displaced into a fluid reservoir, which is in particular a low-pressure reservoir. The fluid reservoir is then isolated from the rest of the hydraulic system and the second input member of the brake booster is moved back into the actuation position. This arrangement reduces a pressure level in the hydraulic system, whereby the isolation of the fluid reservoir prevents hydraulic fluid from flowing in. The low pressure level has the effect that no or only relatively small grinding torques occur on the wheel-side brake actuators. Overall, a relatively large proportion of the available recuperation potential can be utilized.

SUMMARY

Since the general aim with braking systems is to construct them simply and inexpensively, a problem addressed by the present disclosure is that of further simplifying methods of the type mentioned at the outset, in particular the method from DE 10 2014 205 645 A1, as well as associated control units and braking systems.

In one exemplary arrangement, the problem is solved by a method having the following steps:

a) registering a braking request by detecting a brake pedal movement that causes a first input member to be shifted in a direction of a pressure generation unit,
b) determining whether the braking request is to be met by pure recuperative braking, in which a drive machine is operated as a generator,
c) shifting a second input member of a brake booster in the direction of the pressure generation unit to support the braking request, so that the second input member assumes an actuation position corresponding to the braking request, and
d) shifting the second input member, for hydraulic pressure relief, back from the actuation position in a direction away from the pressure generation unit.

In comparison with DE 10 2014 205 645 A1, in the method according to the disclosure, the second input member is no longer moved from the actuation position in the direction of the pressure generation unit. An additional volume of brake fluid is therefore no longer displaced into a fluid reservoir before the actual pressure relief. Rather, the backward shift takes place directly from the actuation position, i.e. without intermediate positions and/or intermediate movements. This makes the method according to the disclosure very simple. Furthermore, the method according to the disclosure is energy-efficient, since the drive energy that is required to move the second input member from the actuation position in the direction of the pressure generation unit can be saved. The energy required for displacing the additional volume into the fluid reservoir can also be saved. Nevertheless, pressure relief comparable to the method from DE 10 2014 205 645 A1 can be achieved. Moreover, since the second input member is not displaced from the actuation position in the direction of the pressure generation unit, the method according to the disclosure also works faster than the method from DE 10 2014 205 645 A1.

In one exemplary arrangement, a backward shift distance by which the second input member is shifted back from the actuation position is smaller than an actuation distance which the second input member travels from a non-actuated starting position into the actuation position. In particular, the backward shift distance is much smaller than the actuation distance. In one exemplary arrangement, the backward shift distance is for example 1% to 10% of the actuation distance. The backward shift can thus be brought about within a relatively short period of time with a relatively low expenditure of energy. Furthermore, the backward shift distance is so small that, taking into account the vibrations that usually occur during the operation of a motor vehicle, it is not noticed at all or is noticed only with great difficulty by a driver.

A backward shift speed at which the second input member is shifted back from the actuation position can be less than a standard backward shift speed at which the second input member is shifted from the actuation position into a non-actuated starting position when the brake pedal is released. In other words, the second input member is shifted back relatively slowly. This also contributes to the fact that, in view of the vibrations usually prevailing during the operation of a motor vehicle, a driver does not notice this backward shift at all or does so only with great difficulty. In particular, although this is not intended to be limiting, in one exemplary arrangement, the backward shift speed is a maximum of 30% of the standard backward shift speed, and in one particular arrangement, a maximum of 20%.

In one exemplary arrangement, the second input member is shifted back almost statically, that is to say extremely slowly. In one exemplary arrangement, the backward shift speed is selected to be so small that a driver does not notice the backward shift.

According to one exemplary arrangement, the second input member reaches the actuation position when the brake pedal does not perform a brake pedal movement or performs a brake pedal movement at a speed below a predetermined limit speed. In other words, an actuation position can only be reached when a braking request by the driver also has a certain degree of constancy, i.e. it no longer changes, at least for a certain period of time. Put simply, the second input member reaches the actuation position when, within a braking operation, the brake pedal has reached a target position which is characterized by the absence of any further brake pedal movement. The method according to the disclosure is therefore not carried out while a driver is pushing down on or releasing the brake pedal, but only when it has assumed a substantially static position that is different from the non-actuated position.

In one exemplary arrangement, the second input member is held in the backwardly shifted position and the pressure relief is thus effective until a changed braking request is registered or a braking request is no longer registered. In this way, the grinding torques on wheel-side brake actuators are reduced over a relatively long period of time, resulting in a high degree of utilization of the recuperation potential over a relatively long period of time.

After it has been determined that the braking request is to be met by pure recuperative braking, a hydraulic fluid reservoir can be hydraulically connected to the pressure generation unit. A hydraulic pressure generated by the pressure generation unit due to the brake pedal movement thus results in the fluid reservoir being filled but not in associated wheel-side brake actuators being actuated. In other words, the brake booster and the driver work into the fluid reservoir and not onto the wheel-side brake actuators. The driver still receives feedback from the brake pedal that is familiar to them in the form of a pedal return force. The driver therefore does not notice that their braking request is met by pure recuperative braking. From the driver's point of view, the vehicle equipped with the braking system behaves normally.

The fluid reservoir is in particular preloaded. Thus, by the pressure reservoir, a pressure level in the hydraulic system is limited to a pressure level corresponding to the preload.

The hydraulic fluid reservoir can be hydraulically connected to the pressure generation unit by opening a pressure relief valve, in particular an ABS outlet valve, associated with a hydraulic brake actuator. In this context, the hydraulic fluid reservoir is used as a low-pressure reservoir in an ABS system. The method according to the therefore does not require any additional components in order to be carried out.

Furthermore, before the second input member is shifted back, in particular in its actuation position, the hydraulic fluid reservoir can be shut off from the pressure generation unit. In other words, the hydraulic fluid reservoir is isolated from the rest of the hydraulic system. Thus, no fluid can escape from the fluid reservoir in connection with the backward shift. The result is comparatively quick and reliable pressure relief.

In one exemplary arrangement, the hydraulic fluid reservoir is shut off from the pressure generation unit by closing the pressure relief valve. Components of braking systems that are usually present are again used to carry out the method. The method can thus be carried out in a simple manner in known braking systems.

The problem is also solved by a control unit of the type mentioned at the outset which is designed to carry out a method according to the. By use of such a control unit, pressure relief in the hydraulic system can thus be achieved in a simple and reliable manner when pure recuperative braking is carried out. As a result, a relatively high proportion of the recuperation potential can be utilized.

In addition, the problem is solved by a braking system comprising a control unit according to the disclosure. Such a braking system has a simple structure. In addition, in connection with pure recuperative braking, it is efficient in that a high proportion of recuperation potential can be utilized.

Moreover, the effects and advantages explained with regard to the method according to the disclosure also apply to the control unit according to the disclosure and the braking system according to the disclosure and vice versa.

BRIEF DESCRIPTION OF DRAWINGS

The disclosure is explained below with reference to an exemplary arrangement which is shown in the accompanying drawings, in which.

DETAILED DESCRIPTION

Figure 1:
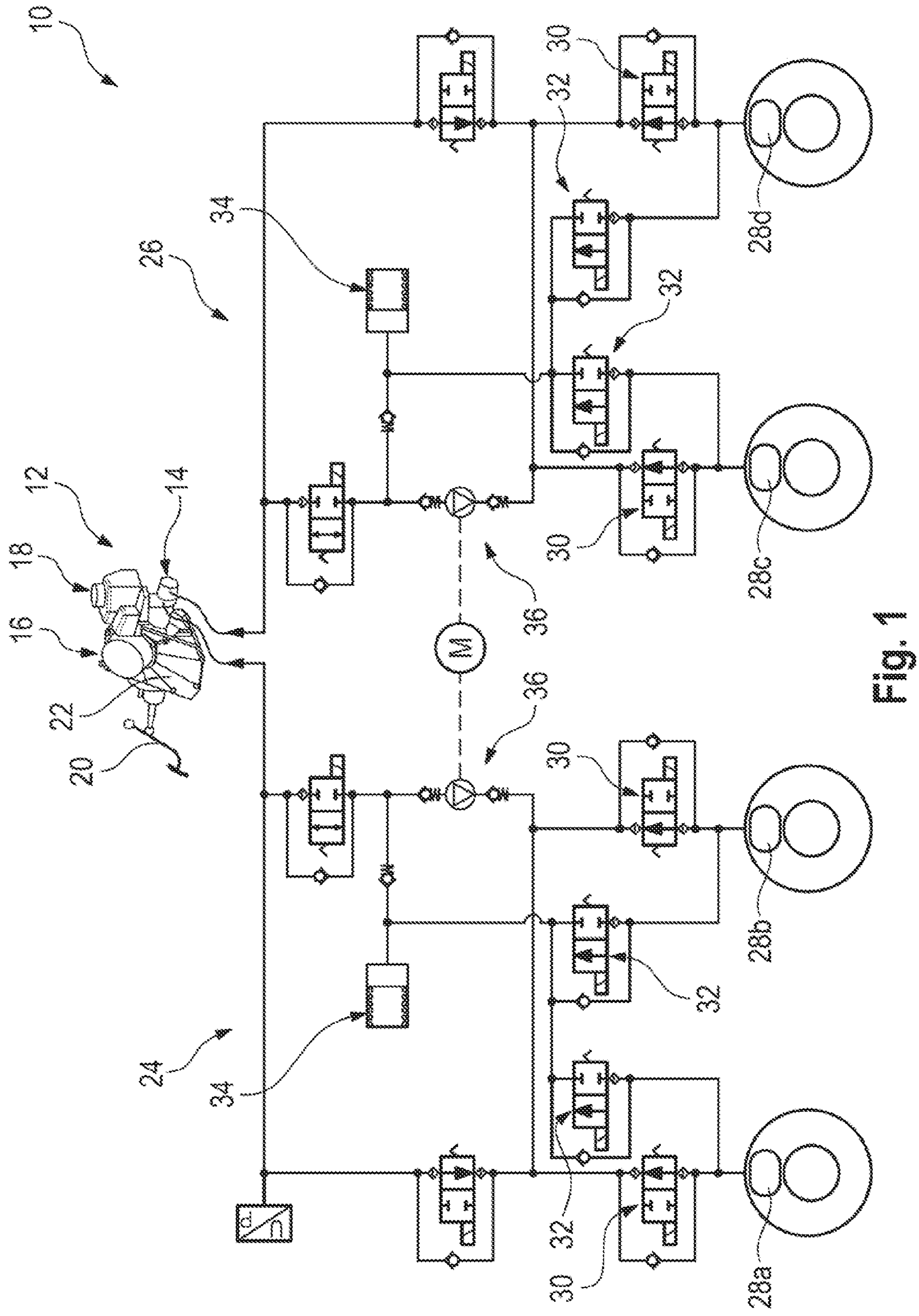
FIG. 1 shows a braking system according to the disclosure with a control unit according to the disclosure which is designed to carry out a method according to the disclosure.

FIG. 1 shows a hydraulic braking system 10 for a motor vehicle with an electrified drive train which has at least one electric drive machine that can be operated as a generator.

For the sake of clarity, the drive machine is not shown.

The braking system 10 comprises a brake master cylinder unit 12 which is substantially composed of a hydraulic pressure generation unit 14 and a brake booster 16.

In addition, the brake master cylinder unit 12 has a fluid reservoir 18 via which the braking system 10 is supplied with brake fluid, which in the present case is a hydraulic fluid.

A brake pedal 20, which can be actuated by a driver of the motor vehicle if necessary, is also coupled to the brake booster 16.

Furthermore, a control unit 22 for controlling the hydraulic braking system 10 is integrated into the brake master cylinder unit 12.

A first brake circuit 24 and a second brake circuit 26 are connected to the pressure generation unit 14.

A first wheel-side brake actuator 28*a* which is associated for example with a front-right wheel can be actuated by the first brake circuit 24.

In addition, a second wheel-side brake actuator 28*b* which is associated for example with a rear-left wheel can be actuated by the first brake circuit 24.

A third wheel-side brake actuator 28*c* which is associated for example with a front-left wheel can be actuated by the second brake circuit 26.

Furthermore, a fourth wheel-side brake actuator 28*d* which is associated for example with a rear-right wheel can be actuated by the second brake circuit 26.

In the exemplary arrangement, the brake circuits 24, 26 are therefore connected diagonally.

In a manner known per se, each of the brake actuators 28*a* to 28*d* is associated with a pressure supply valve 30, which in one exemplary arrangement is designed as an ABS inlet valve.

The pressure supply valves 30 are each preloaded into an open position and, in this position, they hydraulically connect the associated brake actuator 28*a* to 28*d* to the pressure generation unit 14.

Such pressure supply valves 30 are known per se, and will not be described further.

In addition, each brake actuator 28*a* to 28*d* is associated with a pressure relief valve 32, which is designed as an ABS drain valve.

The pressure relief valves 32 are each preloaded into a closed position.

By actuating the pressure relief valves 32, the respectively associated brake actuators 28*a* to 28*d* can be hydraulically connected to a respectively associated fluid reservoir 34.

Such pressure relief valves 32 are also known per se and are therefore not explained in more detail.

In the present case, each of the brake circuits 24, 26 comprises a fluid reservoir 34.

The fluid reservoirs 34 are designed as spring-loaded low-pressure reservoirs. This is also known per se.

Each of the brake circuits 24, 26 is also equipped with a motor-driven pump 36.

Figure 2:
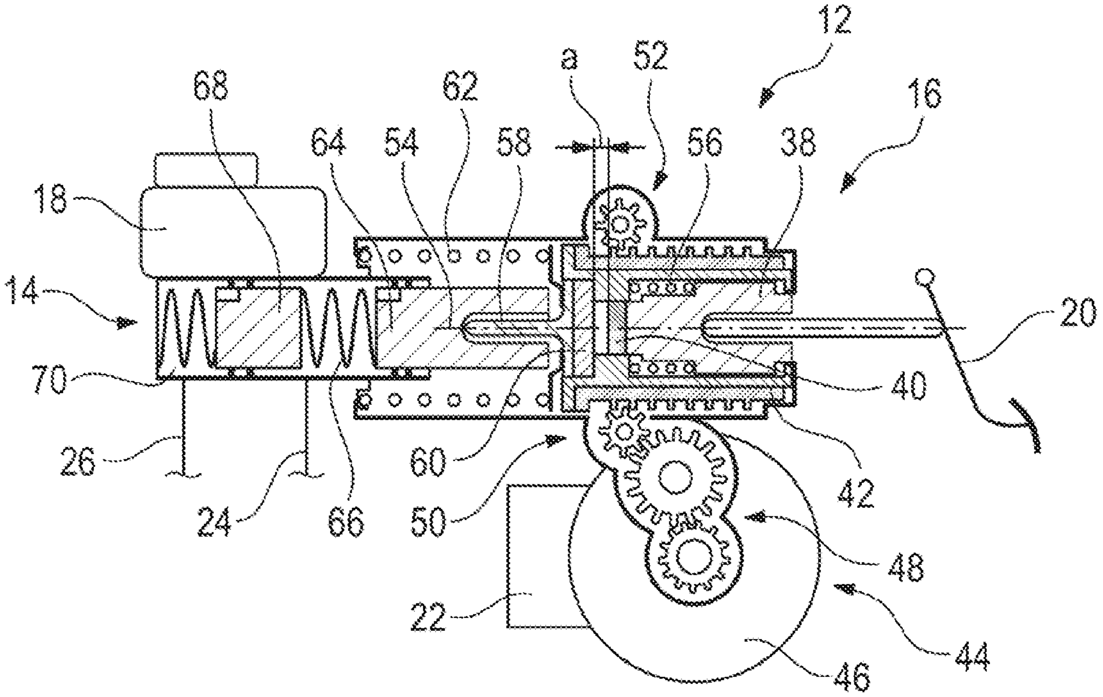
FIG. 2 shows a brake master cylinder unit of the braking system from FIG. 1 in a more detailed, schematic view.

FIG. 2 shows the brake master cylinder unit 12 in detail.

The brake booster 16 comprises a first input member 38 which is coupled directly to the brake pedal 20.

The input member 38 is equipped with a pressure disk 40 on its side facing away from the brake pedal 20.

The brake booster 16 also comprises a second input member 42 which is coupled to a drive unit 44 of the brake booster 16.

Specifically, the drive unit 44 of the brake booster 16 comprises an electric drive motor 46 which is coupled to the second input member 42 via a gear train 48 as well as a first rack-and-pinion gear mechanism 50 and a second rack-and-pinion gear mechanism 52.

The rack-and-pinion gear mechanisms 50, 52 are arranged on opposite sides of the second input member 42.

By operation of the drive motor 46, the second input member 42 can therefore be displaced along an effective axis 54.

The first input member 38 and the second input member 42 are coupled to one another via a spring 56.

The brake booster 16 also comprises an output member 58 which is mounted on the second input member 42 via an elastomer disk 60.

The output member 58 is preloaded in a direction of the second input member 42 by a spring 62.

The output member 58 is coupled to a primary piston 64 which delimits a primary pressure chamber 66 of the pressure generation unit 14 on one side.

In addition, a secondary piston 68 is provided which is positioned so as to be displaceable between the primary pressure chamber 66 and a secondary pressure chamber 70.

The secondary piston 68 can therefore also be referred to as a floating piston.

Hydraulic pressure is applied to the first brake circuit 24 via the primary pressure chamber 66.

Hydraulic pressure is applied to the second brake circuit 26 via the secondary pressure chamber 70.

As already explained, the control unit 22 is designed to carry out a method for operating the braking system 10.

Such a method is explained below in particular with reference to FIGS. 2 and 3.

First, a driver makes a braking request by actuating the brake pedal 20. The brake pedal 20 thus performs a brake pedal movement.

As a result, the first input member 38 of the brake booster 16 is displaced in the direction of the pressure generation unit 14.

An associated brake pedal movement is detected by sensors.

Based on this action, the brake booster 16 is operated in order to support the braking request. Therefore, the second input member 42 is moved by the drive unit 44 into an actuation position corresponding to the braking request.

The movement of the brake pedal and the operation of the brake booster 16 result in a movement of the output member 58 that matches the detected braking request.

Figure 3:
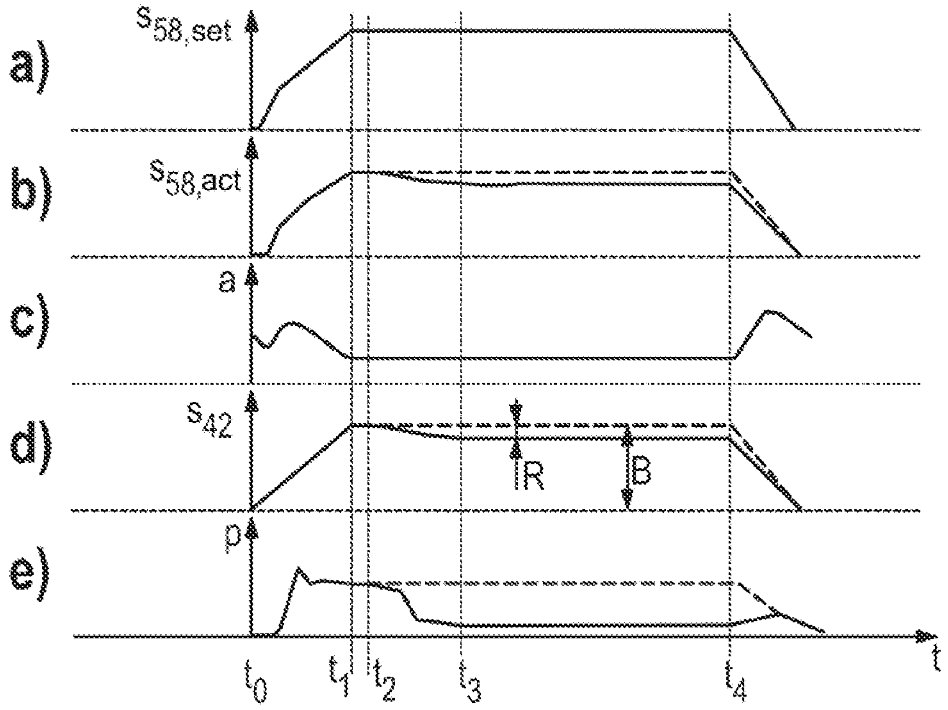
FIG. 3 shows representative curves of an output member of a brake booster of the brake master cylinder at different operational settings

In this context, line a) of FIG. 3 shows a target position $s_{58,soll}$ of the output member 58 over a time t. Braking begins at time $t_0$, i.e, at time $t_0$ the driver begins to press the brake pedal 20.

Due to the fact that the components of the brake master cylinder unit 12 have a mass and thus have a certain inertia, as well as due to the fact that the first input member 38 and the second input member 42 are coupled via the spring 56, the output member 58 only reaches the position $s_{58,ist}$ at time $t_1$, which substantially corresponds to the associated target position $s_{58,soll}$ (see lines 3*a*) and 3*b*) for comparison).

In addition, it can be seen that the actual movement of the output member 58 into this position is subject to certain deviations from the target specification.

Furthermore, the distance a between the pressure disk 40 and the elastomer disk 60 fluctuates, as can be seen from line 3*c*) in FIG. 3, the interval between times $t_0$ and $t_1$.

At time $t_1$, the brake pedal 20 has reached its target position in relation to the braking process under consideration and the distance a is set to a constant, associated amount (see line 3*c*) of FIG. 3).

In other words, at time $t_1$, the brake pedal 20 no longer moves or moves only at a speed below a predetermined limit speed.

The second input member 42 is then in an actuation position associated with the braking request, i.e. essentially the pedal position, which corresponds to the position $s_{42}$ at time $t_1$ (see line 3*d*) of FIG. 3).

Due to the actuation of the brake pedal 20, the distance a between the pressure disk 40 and the elastomer disk 60 at time $t_1$ is smaller than at time $t_0$.

In this context, it is determined by the control unit 22 that the drivers braking request is to be met by pure recuperative braking, in which the drive machine (not shown in more detail) is operated as a generator.

In other words, the brake actuators 28*a*, 28*b*, 28*c*, 28*d* are not intended to be used to decelerate the motor vehicle.

For this reason, all of the pressure relief valves 32 are opened.

The fluid reservoirs 34 are thus hydraulically connected to the pressure generation unit 14.

The pressure generation unit 14 thus displaces hydraulic fluid into the fluid reservoirs 34. A pressure build-up at the brake actuators 28*a* to 28*d* takes place only up to a pressure level corresponding to the preload of the fluid reservoirs 34.

The existing recuperation potential is to be utilized to the maximum.

This means that as large a proportion as possible of the kinetic energy of the motor vehicle should be converted into electrical energy by the drive machine operated as a generator.

For this purpose, the brake circuits 24, 26 are to be relieved of pressure so as to prevent potential grinding of elements of the brake actuators 28*a* to 28*d* on associated brake disks.

In this context, the pressure in the brake circuits 24, 26 should in particular be below a pressure level corresponding to the preload of the fluid reservoirs 34.

For this purpose, the pressure relief valves 32 are closed again, so that the fluid reservoirs 34 are shut off from the pressure generation unit 14.

Thereafter, the second input member 42 is shifted back from the actuation position reached at time $t_1$ in a direction away from the pressure generation unit 14.

This shift back starts at time $t_2$ and is substantially ended at time $t_3$ (see line 3*d*) of FIG. 3).

For comparison only, a position $s_{42}$ of the second input member 42 which the second input member would occupy without the above-mentioned backward shift is indicated in the diagram of line 3*d*) of FIG. 3 by a dashed line.

It is directly apparent that a backward shift distance R by which the second input member 42 is shifted back from the actuation position is smaller than an actuation distance B which the second input member 42 travels from a non-actuated starting position into the actuation position.

In addition, the second input member 42 is shifted almost statically, i.e. very slowly, back from the actuation position, which is shown in the extremely flat curve shape starting from time $t_2$.

In particular, a backward shift speed is less than a standard backward shift speed at which the second input member 42 is shifted from the actuation position into a non-actuated starting position when the brake pedal 20 is released (see line 3*d*) of FIG. 3 from time $t_4$), and in particular is only a maximum of 20% of the standard backward shift speed.

Since the backward shift of the second input member 42 takes place so slowly, this has no effect on the distance between the pressure disk 40 and the elastomer disk 60 (see line 3*c*) of FIG. 3).

However, the backward shift of the second input member 42 also causes a backward shift of the output member 58 (see line 3*b*) of FIG. 3).

This also begins at time $t_2$ and takes place just as slowly as the backward shift of the second input member 42.

For comparison, a dashed line again shows a position $s_{58,ist}$ of the output member 58 which would result without a backward shift of the second input member 42.

Due to the backward shift of the output member 58, there is a pressure reduction in the associated brake actuators 28*a* to 28*d* (see line 3*e*) of FIG. 3).

For comparison, a dashed line shows a pressure p that would result if the second input member 42 were not shifted back.

It can clearly be seen that the backward shift of the second input member 42 significantly reduces the pressure p.

The second input member 42 is held in the backwardly shifted position until a braking request from the driver changes or, as in the exemplary arrangement shown, a braking request is no longer registered.

In the exemplary arrangement shown, the driver releases the brake pedal 20 at time $t_4$.

The first input member 38 then moves back into its non-actuated starting position due to its spring loading.

The second input member 42 is also moved back into its non-actuated starting position as quickly as possible by the drive unit 44 (see line 3*d*) of FIG. 3.

This is followed by the output member 58 (see line 3*b*) of FIG. 3). The same applies to the pressure p on the brake actuators 28*a* to 28*d* (see line 3*e*) of FIG. 3).

The braking system 10 is now back in a non-actuated initial state overall.

The invention claimed is:

1. A method for operating a hydraulic braking system for a motor vehicle with an electrified drive train which has at least one electric drive machine that can be operated as a generator, wherein the braking system comprises a brake booster which has a first input member which is coupled to a brake pedal, a second input member which is coupled to a drive unit of the brake booster, and an output member which is coupled to a hydraulic pressure generation unit, the method comprising the following steps:

a) registering a braking request by detecting a brake pedal movement that causes the first input member to be shifted in a direction of the pressure generation unit, b) determining, based on sensor feedback from brake pedal sensor configured to detect pedal displacement, pedal speed, or pedal acceleration, whether the braking request is to be met by pure recuperative braking, in which the drive machine is operated as a generator, c) shifting the second input member of the brake booster in the direction of the pressure generation unit to support the braking request, so that the second input member assumes an actuation position corresponding to the braking request, and d) shifting the second input member back from the actuation position in a direction away from the pressure generation unit for hydraulic pressure relief, wherein the control unit determines when to initiate and terminate the backward shift of the second input member based on whether the pedal movement has reached a substantially static condition.

2. The method according to claim 1, wherein a backward shift distance by which the second input member is shifted back from the actuation position is smaller than an actuation distance which the second input member travels from a non-actuated starting position into the actuation position.

3. The method according to claim 2, wherein a backward shift speed at which the second input member is shifted back from the actuation position is less than a standard backward shift speed at which the second input member is shifted from the actuation position into a non-actuated starting position when the brake pedal is released.

4. The method according to claim 2, wherein the second input member reaches the actuation position when the brake pedal does not perform a brake pedal movement or performs a brake pedal movement at a speed below a predetermined limit speed.

5. The method according to claim 1, wherein a backward shift speed at which the second input member is shifted back from the actuation position is less than a standard backward shift speed at which the second input member is shifted from the actuation position into a non-actuated starting position when the brake pedal is released.

6. The method according to claim 5, wherein the second input member is shifted back from the actuation position at a speed below a predetermined minimal threshold, such that the movement is substantially static.

7. The method according to claim 5 wherein the second input member is held in a backwardly shifted position until a changed braking request is registered or a braking request is no longer registered.

8. The method according to claim 1, wherein the second input member reaches the actuation position when sensor feedback indicates that the brake pedal is either not actuated or is actuated at a speed below a predetermined threshold, wherein the threshold corresponds to a predefined limit speed associated with pedal-speed detection logic of the control unit.

9. The method according to claim 8 wherein the second input member is held in a backwardly shifted position until a changed braking request is registered or a braking request is no longer registered.

10. The method according to claim 9, wherein, after it has been determined that the braking request is to be met by pure recuperative braking, a hydraulic fluid reservoir is hydraulically connected to the pressure generation unit.

11. The method according to claim 1 wherein the second input member is held in a backwardly shifted position until a changed braking request is registered or a braking request is no longer registered.

12. The method according to claim 1, wherein, after it has been determined that the braking request is to be met by pure recuperative braking, a hydraulic fluid reservoir is hydraulically connected to the pressure generation unit.

13. The method according to claim 12, wherein the hydraulic fluid reservoir is hydraulically connected to the pressure generation unit by opening a pressure relief valve, associated with a hydraulic brake actuator.

14. The method according to either claim 12 wherein, before the second input member is shifted back, in its actuation position, the hydraulic fluid reservoir is shut off from the pressure generation unit.

15. The method according to claim 13, wherein the hydraulic fluid reservoir is shut off from the pressure generation unit by closing the pressure relief valve.

16. The method according to claim 13, wherein the pressure relief valve is an ABS outlet valve.

17. The method according to claim 13 wherein, before the second input member is shifted back in its actuation position, the hydraulic fluid reservoir is shut off from the pressure generation unit.

18. The method according to claim 14, wherein the hydraulic fluid reservoir is shut off from the pressure generation unit by closing the pressure relief valve.

19. A control unit for a hydraulic braking system, wherein the control unit is designed to carry out a method according to claim 1.

20. A motor vehicle comprising a control unit according to claim 19.

* * * * *